US009544321B2

United States Patent
Baikalov et al.

(10) Patent No.: US 9,544,321 B2
(45) Date of Patent: Jan. 10, 2017

(54) ANOMALY DETECTION USING ADAPTIVE BEHAVIORAL PROFILES

(71) Applicant: Securonix, Inc., Los Angeles, CA (US)

(72) Inventors: Igor A. Baikalov, Thousand Oaks, CA (US); Tanuj Gulati, Carrollton, TX (US); Sachin Nayyar, Los Angeles, CA (US); Anjaneya Shenoy, Addison, TX (US); Ganpatrao H. Patwardhan, Portland, OR (US)

(73) Assignee: Securonix, Inc., Los Angeles, CA (US)

( * ) Notice: Subject to any disclaimer, the term of this patent is extended or adjusted under 35 U.S.C. 154(b) by 28 days.

(21) Appl. No.: 14/811,732

(22) Filed: Jul. 28, 2015

(65) Prior Publication Data

US 2016/0226901 A1 Aug. 4, 2016

Related U.S. Application Data

(60) Provisional application No. 62/110,031, filed on Jan. 30, 2015.

(51) Int. Cl.
*H04L 29/06* (2006.01)
*G06N 7/00* (2006.01)

(52) U.S. Cl.
CPC ....... *H04L 63/1425* (2013.01); *H04L 63/1433* (2013.01); *H04L 63/1416* (2013.01)

(58) Field of Classification Search
CPC ............. H04L 63/1425; H04L 63/1416; H04L 63/1433

(Continued)

(56) References Cited

U.S. PATENT DOCUMENTS

| 6,850,252 | B1 * | 2/2005 | Hoffberg | G06K 9/00369 348/E7.061 |
| 8,171,545 | B1 * | 5/2012 | Cooley | G06F 21/552 726/22 |

(Continued)

FOREIGN PATENT DOCUMENTS

WO 2014152469 A1 9/2014

OTHER PUBLICATIONS

Perdisci, R. "McPAD: A Multiple Classifier System for Accurate Payload Detection", Elsevier Science, Oct. 23, 2008.

(Continued)

*Primary Examiner* — Haresh N Patel
(74) *Attorney, Agent, or Firm* — Barry N. Young

(57) ABSTRACT

Anomalous activities in a computer network are detected using adaptive behavioral profiles that are created by measuring at a plurality of points and over a period of time observables corresponding to behavioral indicators related to an activity. Normal kernel distributions are created about each point, and the behavioral profiles are created automatically by combining the distributions using the measured values and a Gaussian kernel density estimation process that estimates values between measurement points. Behavioral profiles are adapted periodically using data aging to de-emphasize older data in favor of current data. The process creates behavioral profiles without regard to the data distribution. An anomaly probability profile is created as a normalized inverse of the behavioral profile, and is used to determine the probability that a behavior indicator is indicative of a threat. The anomaly detection process has a low false positive rate.

17 Claims, 5 Drawing Sheets

(58) Field of Classification Search
USPC ..................................................... 726/20–25
See application file for complete search history.

(56) References Cited

U.S. PATENT DOCUMENTS

| | | | |
|---|---|---|---|
| 8,418,249 B1 | 4/2013 | Nucci | |
| 9,451,019 B2* | 9/2016 | Herz | ........................ H04L 67/18 726/1 |
| 2007/0028110 A1* | 2/2007 | Brennan | ................ G06F 21/552 713/176 |
| 2007/0028291 A1* | 2/2007 | Brennan | ............. H04L 63/1408 726/1 |
| 2007/0028302 A1* | 2/2007 | Brennan | ................. G06F 21/55 726/24 |
| 2007/0028303 A1* | 2/2007 | Brennan | ................. G06F 21/55 726/24 |
| 2007/0028304 A1* | 2/2007 | Brennan | ................. G06F 21/55 726/24 |
| 2007/0240207 A1 | 10/2007 | Belakhdar | |
| 2008/0189786 A1 | 8/2008 | Tang | |
| 2008/0271143 A1 | 10/2008 | Stephens | |
| 2012/0137367 A1 | 5/2012 | Dupont | |
| 2013/0059607 A1* | 3/2013 | Herz | ........................ H04L 67/20 455/456.3 |
| 2013/0066860 A1* | 3/2013 | Kilpinen | ................. G06F 19/20 707/723 |
| 2013/0067106 A1 | 3/2013 | Lakshminarayan | |
| 2013/0179078 A1* | 7/2013 | Griffon | ................... G06Q 50/26 702/3 |
| 2013/0204531 A1* | 8/2013 | McManus | ............ G01N 21/718 702/2 |
| 2014/0047544 A1* | 2/2014 | Jakobsson | ................ G06F 21/55 726/23 |
| 2014/0059456 A1* | 2/2014 | van der Elzen | ...... G06T 11/206 715/764 |
| 2014/0108314 A1 | 4/2014 | Chen et al. | |
| 2014/0268133 A1* | 9/2014 | McManus | ................ G01J 3/443 356/316 |
| 2015/0033305 A1* | 1/2015 | Shear | ...................... G06F 21/45 726/6 |
| 2015/0100244 A1* | 4/2015 | Hannum | ................. G06F 19/22 702/19 |
| 2015/0205954 A1 | 7/2015 | Jou | |
| 2016/0014159 A1* | 1/2016 | Schrecker | ........... H04L 63/0869 726/1 |

OTHER PUBLICATIONS

Wang, K. "Anomalous Payload-Based Network Intrusion Detection", Columbia University, RAID Sep. 2004.

* cited by examiner

ANOMALY DETECTION USING ADAPTIVE BEHAVIORAL PROFILES

CROSS-REFERENCE TO RELATED APPLICATIONS

This application claims the benefit of U.S. application Ser. No. 62/110,031, filed Jan. 30, 2015, the disclosure of which is incorporated by reference herein.

BACKGROUND

The rapid detection of security threats is critical for organizations to prevent the compromise of their computer systems, data, networks and applications Organizations, whether commercial, educational or governmental, and other enterprises store and transfer the majority of their data in digital form in computer systems and databases. Much of this data is valuable confidential commercial information or private information about individual employees or members that is not intended for public view, and any exposure or manipulation of this data could cause the organization and individuals great financial or reputational damage. Organizations are consistently challenged by threats aimed at stealing, exposing or manipulating this digital data. A large number of these attacks, as reported by the news media, have involved fraud, data breach, intellectual property theft or national security. Some attackers who may have been backed by nation states or organizations with political agendas have taken to more sinister attacks aimed at gaining control or damaging critical infrastructures.

Organizations typically employ a multi-layered network topology to separate various components of their IT infrastructure from the Internet. Workstations and servers are generally protected from direct access via the Internet or other external networks by a web proxy server; Internet traffic is typically terminated at "demilitarized network zones" (DMZ); and the incoming traffic is filtered through a firewall. External attackers normally attempt to penetrate an organization's defenses that are set up at the organization's network perimeter, and many security solutions exist to address external attacks. However, once external attackers breach the perimeter and get onto the internal network, they typically operate under the guise of an internal user by either hijacking an existing user's account or by creating a new user. Internal attackers are more insidious and more difficult to defend against because they are users of the organization's computer network systems. They have legitimate IT accounts, and their unauthorized or illicit activities may generally fall within their areas of responsibility, but exceed what is normal behavior. Attacks may even involve a nexus between external and internal attackers. For instance, detecting illicit activity by an insider customer service representative such as granting a customer an inappropriately large refund may be very difficult to detect.

Most security solutions primarily utilize signatures of known attacks to identify and alert on similar attacks. In order to define signatures for any new threat, the underlying components of the associated threat vector must be studied in detail and signatures of these threat vectors must be made available to a threat detection system. There are several major shortcomings of these signature-based threat detection approaches. The development of signatures for new threats requires an in-depth analysis on an infected system, which is time consuming and resource intensive, and may be too slow to address quickly evolving threats. Signatures do not adapt themselves to changes in threat vectors. Moreover, signature-based approaches are ineffective for zero-day attacks that exploit previously unknown vulnerabilities, and are not available for detecting insider threats originating from within an organization. Identifying insider attacks typically involves constructing various profiles for the normal behaviors of insiders, detecting anomalous deviations from these profiles, and estimating, the threat risk of these anomalies. However, constructing profiles that accurately characterize normal insider behavior is difficult and is not an exact art. For example, many profiles are constructed using statistical approaches for observables that are assumed incorrectly to be normally distributed when they are not. Using such profiles for detecting behavior anomalies can produce erroneous results and lead to many false positive alerts that overwhelm security analysts. Balancing between the risk of missing an actual threat, by using high confidence levels for detection to minimize false positives and using an overly permissive approach that floods security analysts with alerts is a difficult trade-off.

There is a need for systems and methods that address these and other anomaly detection problems in protecting organizations from data breaches and other losses. In particular, there is a need for proactive, reliable adaptive defense capabilities for detecting anomalous activity within an organization's IT infrastructure to identify threats while minimizing false positive alerts. It is to these ends that this invention is directed.

SUMMARY OF THE INVENTION

The invention provides a system and method for automatic creation of adaptive behavioral profiles for observables associated with resource states and events in a computer network (IT) infrastructure of an enterprise and for detecting anomalies that represent potential malicious activity and threats as deviations from normal behavior. Separate profiles may be created for each behavioral indicator, as well as for each time series of measurements, and aggregated to create an overall behavioral profile. An anomaly probability is determined from the behavioral profile and used to evaluate the data values of observables. Outlier data values which deviate from normal behavior by more than a predetermined probability threshold are identified for risk analysis as possible threats while inliers within the range of normal behavior are used to update the behavioral profile. Behavioral profiles are created for behavioral indicators based upon observables measured over predetermined time periods using algorithms employing statistical analysis approaches that work for any type of data distribution, and profiles are adapted over time using data aging to more closely represent current behavior. Algorithm parameters for creating profiles are based on the type of data, i.e., its metadata.

DESCRIPTION OF PREFERRED EMBODIMENTS

The invention is particularly well adapted to adaptive profile generation and anomaly detection for risk assessment in computer network infrastructures of enterprises, and will be described in that environment. It will be appreciated, however, that this is illustrative on only one utility of the invention, and that the invention has greater applicability and utility in other contexts.

The invention affords a machine learning system and method that comprise a computer of an organization's computer network infrastructure and executable instructions stored in a computer readable non-transitory medium that control the computer to create behavioral profiles and anomaly probability characteristics based upon a time series of observable events and/or network resource states for evaluating activities to detect anomalies. As will be described in more detail, a behavioral profile may be created for each behavioral indicator of an activity for any entity whether it is a person, computer system or application. Identity aggregation monitors all entities associated with an activity to capture entity activities that otherwise could be obscured or masked by multiple entity identifiers or aliases. A profile is created to comprise a condensed cyclical representation of past behavior, organized according to the time series the behavior represents. For instance, a simple daily profile comprises a statistical description of data for any given day, while a day of the week profile is a collection of seven daily profiles, one for each day of the week. The statistical description depends upon the distribution of data. It may be uniform, as for a range of data, unimodal having a single peak, or multimodal having multiple peaks. Regardless of how complex the data distribution is, the invention enables automated creation of behavioral profiles for a practically unlimited number of observations. Adaptive profile aging enables affords incremental real time updates to profiles to accommodate changing behavioral patterns.

Figure 1:
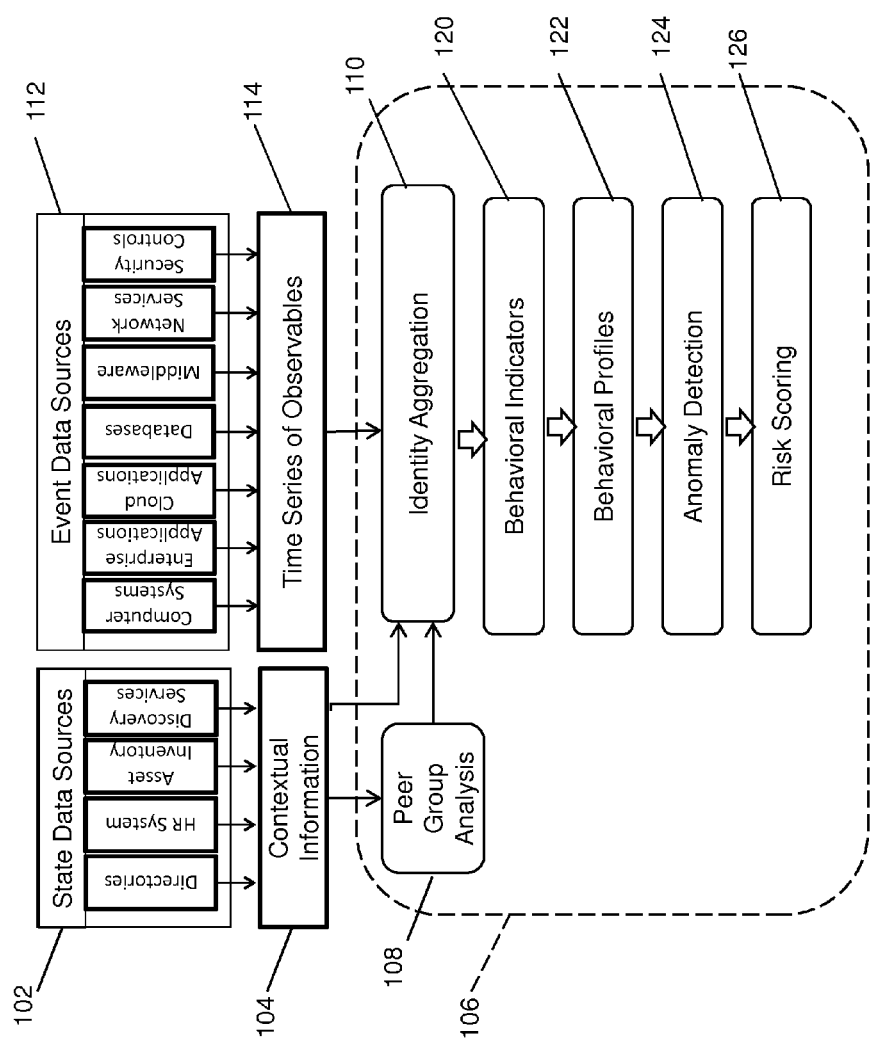
FIG. 1 is a diagrammatic view giving an overall view of data sources and processes in accordance with the invention for creating behavioral profiles and for detecting anomalies.

FIG. 1 is a diagrammatic view that illustrates some of the data sources and operations performed by the invention for creating profiles and for evaluating events to detect anomalies. As shown, an organization's state data sources 102 comprising directories, an HR system, an asset inventory and discovery services, for instance among others, may provide contextual information 104 for processes 106 including peer group analysis 108 and identity aggregation 110. Similarly, event data sources 112 of the organization such as computer systems, enterprise applications, cloud applications, databases, middleware, network services and security controls, for instance, may provide a time series of observables 114 to the identity aggregation processes 110.

Peer group analysis 108 identifies functionally similar groups of actors (users or resources) based on their attributes as provided by the inventory systems and predefined grouping rules. For example, users can be grouped by their job title, organizational hierarchy, or location, or any combination of attributes that indicate similarity of job function. Systems and devices can be grouped by the function they perform (e.g., database, application, or web server), network location (e.g., DMZ or other network segment), or organizational environment (e.g., production, test, development, etc.) Peer groups may be further refined by observing similarities in access patterns, based on granted access entitlements or actual logged resource access. It is desirable to accurately identify peer groups to ensure low false positive rates in detecting access or behavior outliers.

Behavioral profiles 122 (FIG. 1) are created from measurements of behavioral indicators 120 (FIG. 1), in a manner to be described below. Behavioral indicators comprise a series of independent measurements of an observable associated with an activity over a specific time period. For example, for customer service transactions, observables may be counts of transactions by hours and day of the week, as well as the amount of each transaction. For monitoring database activity, observables may be the number of concurrent users per hour and the daily volume of data consumed by each user for specific use cases. Appropriate time periods may be selected based upon any of a number of different factors, such as, for instance, the volume of observations and expected volatility. Preference also may be given to time periods that reflect real life patterns, such as working hours or workdays. To avoid profile skew, it is preferable to use behavioral indicators that are independent of one another (uncorrelated), or at least not closely correlated.

In accordance with the invention, a behavioral profile is created at 122 for each behavioral indicator 120, whether it be for an individual, a peer group, an actor or a resource, which is then used to create a normalized anomaly probability for detecting anomalies 124 (FIG. 1) as will be described. Anomalies may then be subjected to a risk scoring process 126 to determine their potential risk of being a threat. The behavioral profile is a condensed cyclic representation of past behavior organized to the specific time period it represents. A simple daily profile contains a statistical description of data for any given day, while a day of the week profile is a collection of seven daily profiles, one for each day of the week. The statistical description depends on the particular distribution of the data. The distribution may be uniform corresponding to a range of data, unimodal having a single peak, or multimodal having multiple peaks. As will be described, the profile generation and anomaly detection processes of the invention work equally as well for any type of data distribution.

Figure 2:
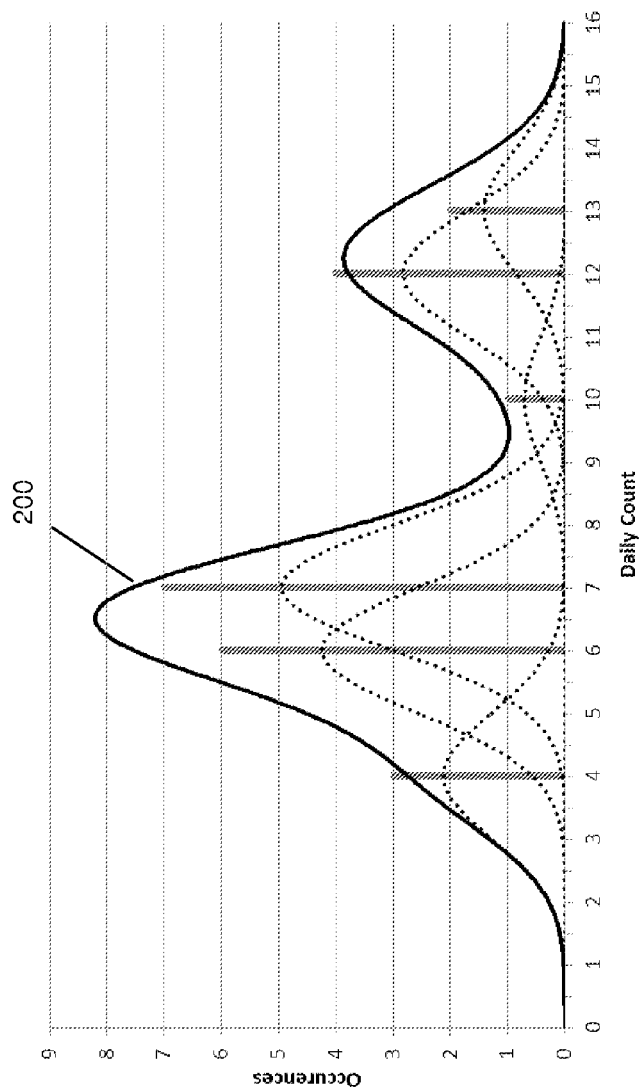
FIG. 2 is a plot that illustrates process in accordance with the invention for the creation of a behavioral profile.

The invention employs an algorithmic process that automates the creation of a behavioral profile by reducing a large set of observations, regardless of distribution, to a small set of statistical parameters, and continuously updates and adapts the profile using current data to improve anomaly detection. The behavioral profile establishes a baseline for what is considered to be normal behavior, and the anomalies are detected as deviations from that normal behavior. In accordance with a preferred embodiment, the invention uses Gaussian kernel density estimation to build the behavioral profile, although other analytical approaches may be used as well. FIG. 2 illustrates the process of building the behavioral profile from actual observables.

As shown on the plot of FIG. 2, actual measurements of daily counts of observables are shown by the vertical lines at counts of 4, 6, 7, 10, 12 and 13 on the abscissa of the plot, which together form a histogram. The height of each vertical line indicates the number of occurrences of that count on the ordinate of the plot, and the dotted curves centered about each vertical line represent a normal kernel distribution for that count. The solid smooth curve 200 corresponds to the overall behavioral profile. It corresponds to a kernel density estimate that is formed by summing the individual kernels for each of the measurements. The kernel density may be estimated about each point (daily count), v, over a sliding window $\tau = \pm 4.5$ h using the actual measured observations and the Gaussian kernel density function:

$$\varphi^*(v) = \frac{1}{\sqrt{2}} \sum_{\tau=-4.5h}^{4.5h} e^{-\frac{\tau^2}{2h^2}} \varphi(v+\tau)$$

where h is the kernel bandwidth that controls how much blur or noise is introduced. The bandwidth, h, may be selected based upon the type of data i.e., the metadata that describes the type characteristics of the data. The minimum bandwidth may be selected based upon the maximum resolution of the data, e.g., event counts comprise discrete numbers and have an increment of 1. Accordingly, for count, type data, 1 should be the minimum bandwidth. For data with an unbounded range, such as the count of bytes in a transaction, the bandwidth is preferably linearly dependent ort the count value to maintain a consistent error range. For instance, to allow a 10% variation in the data, the bandwidth should increase as 0.1 of value, i.e., h=1+0.1v. For data having a bounded range, such as event frequency, the bandwidth should preferably be constant and may be determined by the actual bandwidth using, for example, the medium absolute deviation (MAD) and Silverman's rule, but preferably is not less than the 10% variation. Assuming a midrange frequency of 0.5, the minimum bandwidth would be 0.05:

$$h = \min\left(0.05, \sqrt[5]{\frac{4}{3N}} \cdot MAD\right)$$

where N is the number of data points and MAD is the medium absolute deviation

Figure 3:
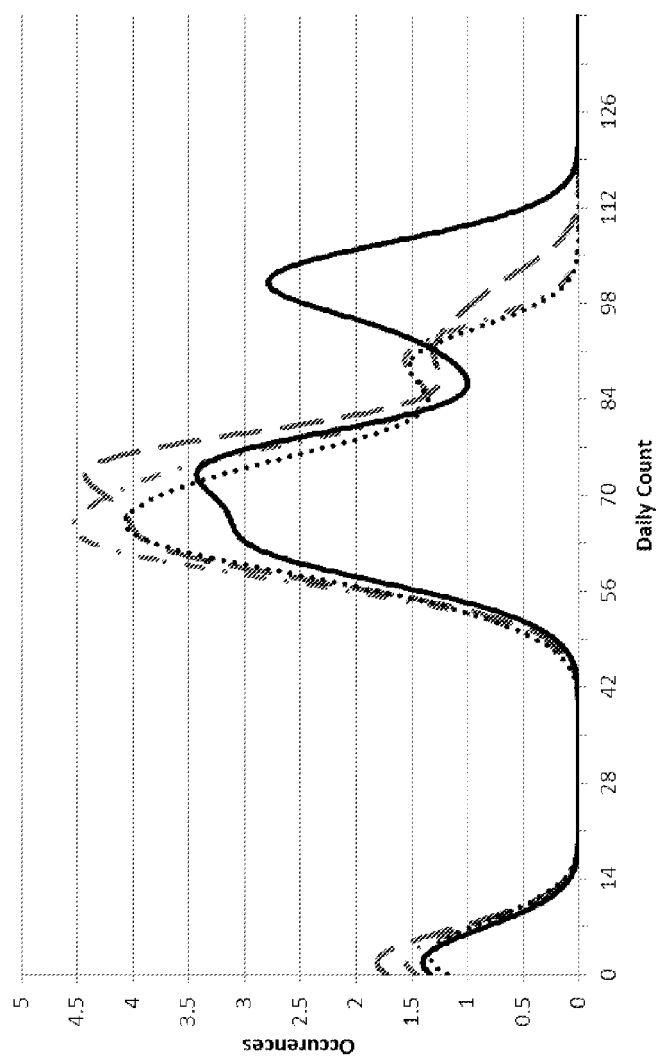
FIG. 3 illustrates an example of the effects of an adaptive profile aging process in accordance with the invention.

The invention preferably employs an adaptive profile aging process which adapts a profile by weighting it in favor of the most recent data, where older observations are eventually phased out after a selected aging period. This allows the profile to mutate over time to maintain currency with changing behavior. The profile aging process of the invention preferably adapts a profile by using an exponential decay factor to gradually forget old data while adapting to the new behavior. The exponential decay factor may be determined from a function of the form: $N(t)=N_0 2^{-t/h}$, where h is the desired half-life of the decay at a time at which the weight of the original behavior decreases by half. Preferably, the adaptive profile aging process is performed at the beginning of each cycle, where the process multiplies the previous profile by the decay factor to deemphasize older data before any new observations are added. FIG. 3 illustrates an example of the effects of profile aging where the half-life is 14 days. The figure shows four curves 302, 304, 306 and 308 that represent successive changes in a behavioral profile over respective successive time periods due to adaptive aging. This adaptive profile aging process of the invention is computationally efficient since it only requires multiplying each profile by the same decay factor over the successive days. Moreover, the aging process has a long memory of past observations which contributes to the stability of the profile. A profile may be initially created from all available data during a training phase, and then periodically updated and adapted with new observations vetted for normality, as will be described.

As indicated above, anomalies may be detected by determining their deviations from associated normal behavioral profiles. Since profiles are not normalized, profiles of different behavioral indicators cannot be directly compared with one another, which complicates characterizing deviations of different indicators. Accordingly, the invention introduces a new approach to detecting anomalies that normalizes deviations from a profile by defining and employing an anomaly probability function which measures the probability that a deviation from the normal behavioral profile is an anomaly. In accordance with the invention, the anomaly probability function P(v) may be defined as a Lorentz function of the behavioral profile:

$$P(v) = \frac{1}{1+\left(\frac{\varphi^*(v)}{k}\right)^2}$$

where $\varphi^*(v)$ is the behavioral profile, and k is the number of observations at which the probability is 0.5. The anomaly probability function has a value between 0 and 1 that indicates the probability that a deviation is an anomaly. The anomaly probability function produces a characteristic profile that is substantially a normalized inverse of the behavioral profile, as can be seen in FIG. 4.

Figure 4:
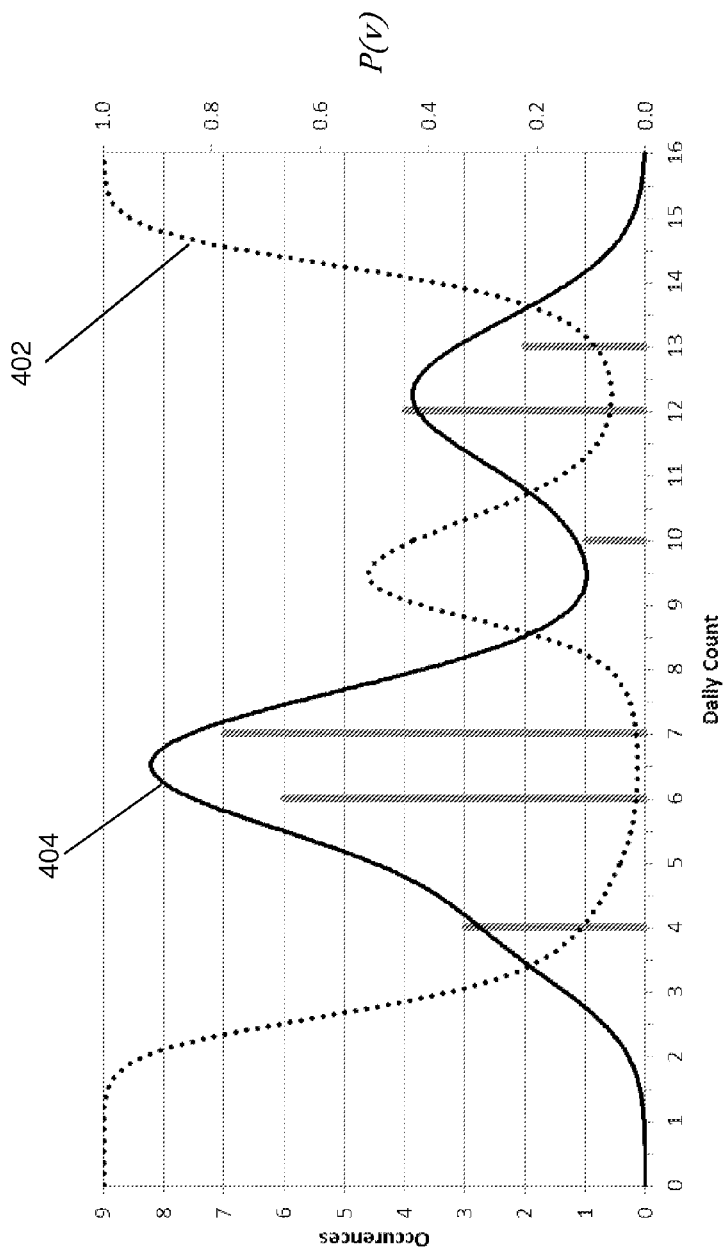
FIG. 4 illustrates a representation of an anomaly probability characteristic in accordance with the invention superimposed on the behavioral profile plot of FIG. 2.

FIG. 4 illustrates the anomaly probability 402 as determined by the anomaly probability function superimposed upon the behavioral profile 404 and actual measurements of FIG. 2 for k=1. As shown, the anomaly probability which is indicated on the right-hand ordinate scale varies between 0.0 and 1.0. The anomaly probability function enables real-time data to be compared with the current anomaly probability in order to detect outlier values which deviate from the behavioral profile by more than a predetermined amount, and, accordingly, have a correspondingly higher probability of being an anomaly. Such outliers may represent a malicious attack, and the corresponding activities can be further investigated using the risk calculation process 126 (FIG. 1) to determine the likelihood that they are associated with an actual threat. On the other hand, inners are data values of observations which do not significantly deviate from the normal profile. They have an anomaly probability that is less than the preset threshold, and are considered to be normal variances rather than threats. Thus, these inliers are used to update the behavioral profile in real time. This enables the profile to remain current and its accuracy to increase, which affords timely anomaly detection.

An anomaly of individual behavioral indicator, $P_I$, may be defined as a deviation from the normal profile, and is the opposite of normality ($P_N=1-P_I$), which may be measured as a statistical probability of the new observation coming from the same population as described by the behavioral profile. Therefore, if the observation fits the profile within a statistically determined margin of error, then $P_N=1$ and $P_I=0$. If the observation deviates significantly from the profile, then $P_N$ goes to 0 and $P_I$ approaches 1. An individual anomaly may then be compared to the corresponding peer group anomaly, $P_G$. If the observed behavior is normal for peers ($P_G$ is low), and the effective anomaly may be discounted to reduce false positives:

$$\overline{P}=P_I \cdot P_G$$

and the effective anomaly may be compared to the resource profile. In this case, any resource anomaly, $P_R$, will be an amplifying factor, i.e.:

$$\hat{P}=1-(1-\overline{P})(1-P_R)$$

Figure 5:
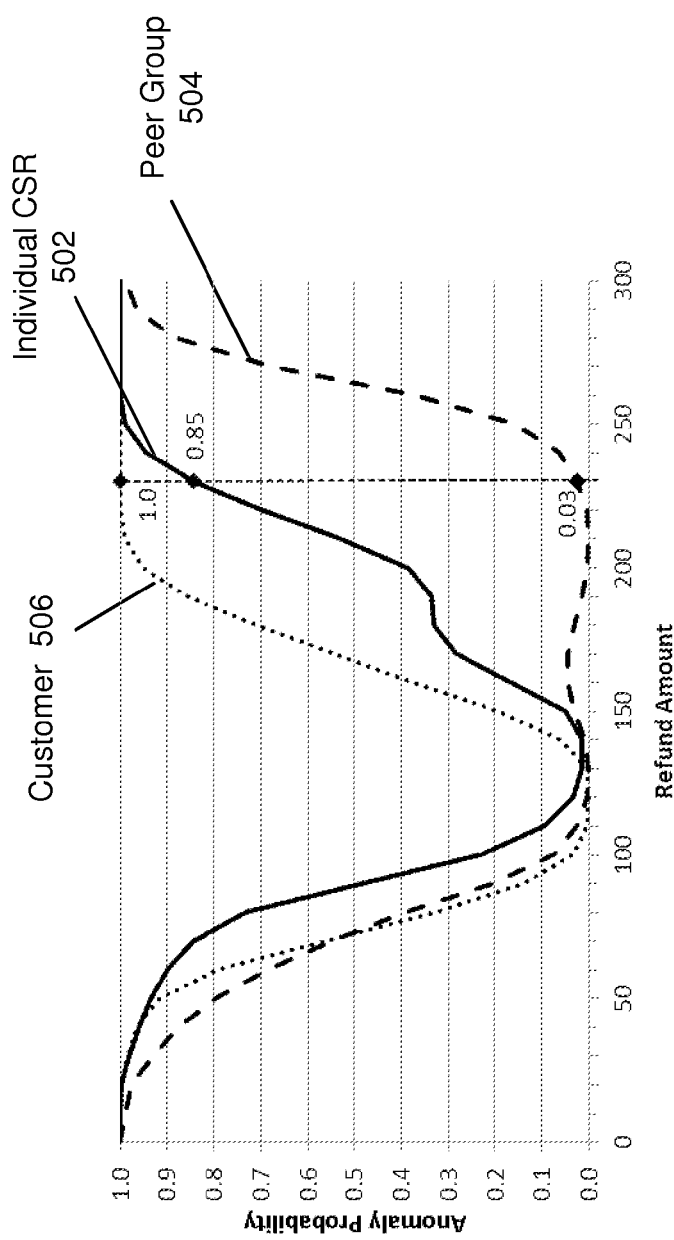
FIG. 5 illustrates an example of anomaly detection in accordance with the invention using anomaly probability.

FIG. 5 illustrates an example of anomaly detection using anomaly probability in the context of a refund transaction. In the example, the behavioral profile 502 for the refund amount issued by an individual customer service representative (CSR) may be compared to his peer group profile 504 as well as to the particular customer profile 506. While a $230 may be an unusual refund amount for this individual CSR ($P_I$=0.85), it is in an acceptable range for his peers ($P_G$=0.03), and the resulting anomaly probability is low ($\bar{P}$=0.85·0.03=0.026). However, the amount issued to this specific customer is highly unusual ($P_R$=1.0). Therefore, this transaction may be flagged with a high degree of probability ($\hat{P}$=1.0) as being an anomaly.

As will be appreciated from the foregoing, an anomaly detection process using adaptive behavioral profiles in accordance with the invention enables automated anomaly detection in real time. It is easy to implement, is computationally efficient and is readily adaptable to different purposes. It has wide applicability to both internal and external activities and events of individuals, groups, and resources within a computer network of an organization. Moreover, the process may be used for fine-grained as well as large scale detection of anomalies, has good accuracy, and affords low false positive rates.

While the foregoing has been with respect to particular embodiments of the invention, it will be appreciated that changes to these embodiments may be made without departing from the principles of the invention, the scope of which is defined by the appended claims.

The invention claimed is:

1. A method of automated detection of anomalous activities in a computer network of an organization comprising:
    measuring, at a plurality of points, values of observables corresponding to behavioral indicators related to an activity over a predetermined period of time;
    forming distributions of estimated values about said plurality of points based upon said measured values of observables at said points;
    creating a behavioral profile for each of said behavioral indicators over a range of points by combining said distributions and said measured values using a kernel density estimation process, wherein said creating a behavioral profile using the kernel density estimation process comprises selecting a kernel bandwidth based upon the type of data being measured;
    forming an anomaly probability based upon a normalized inverse of said behavioral profile;
    determining a probability that a behavioral indicator that deviates from said behavioral profile for said behavioral indicator by more than a predetermined amount is an anomaly by comparing said behavioral indicator to said anomaly probability; and
    identifying that said activity is an anomaly when said determined probability exceeds a predetermined threshold.

2. The method of claim 1 further comprising aggregating in groups entities associated said activity that have similar functions, and wherein said measuring comprises measuring observables associated with said grouped entities.

3. The method of claim 2 wherein said aggregating comprises identifying as being the same entity entities that have multiple identities or aliases.

4. The method of claim 1, wherein said forming distributions of estimated values comprises forming kernels of distributed values about said points.

5. The method of claim 1, wherein creating said behavioral profile comprises summing said distributions, and wherein said kernel density estimation process comprises using a Gaussian kernel density function to estimate values between measurement points to create said behavioral profile.

6. The method of claim 5, wherein said anomaly probability is created by a Lorentz function of said Gaussian kernel density function.

7. The method of claim 1, wherein selecting a kernel bandwidth comprises selecting for data having an unbounded range a bandwidth that incrementally increases with the value of a measurement point, and selecting for data with a bounded range a bandwidth that is constant and based upon the actual data distribution.

8. The method of claim 1 further comprising periodically adapting said behavioral profile using aging to deemphasize older data, said aging comprising reducing values of a previous behavioral profile by a predetermined decay factor before updating the behavioral profile with current data.

9. The method of claim 8 further comprising using measured observable values that have a probability less than said predetermined threshold to update said behavioral profile, and characterizing as outliers for threat analysis values having a probability greater than said predetermined value.

10. A non-transitory computer readable medium embodying executable instructions for controlling a computer to perform automated detection of anomalous activities in a computer network comprising;
    measuring, at a plurality of points, values of observables corresponding to behavioral indicators related to an activity over a predetermined period of time, wherein said creating a behavioral profile using the kernel density estimation process comprises selecting a kernel bandwidth based upon the type of data being measured;
    forming distributions of estimated values about said plurality of points based upon said measured values of observables at said points;
    creating a behavioral profile for each of said behavioral indicators over a range of points by combining said distributions and said measured values using a kernel density estimation process forming an anomaly probability based upon a normalized inverse of said behavioral profile;
    determining a probability that a behavioral indicator that deviates from said behavioral profile for said behavioral indicator by more than a predetermined amount is an anomaly by comparing said behavioral indicator to said anomaly probability; and
    identifying that said activity is an anomaly when said determined probability exceeds a predetermined threshold.

11. The non-transitory medium of claim 10 further comprising aggregating in groups entities associated said activity that have similar functions, and wherein said measuring comprises measuring observables associated with said grouped entities.

12. The non-transitory medium of claim 10, wherein said forming distributions of estimated values comprises forming kernels of distributed values about said points.

13. The non-transitory medium of claim 10, wherein creating said behavioral profile comprises summing said distributions, and wherein said kernel density estimation process comprises using a Gaussian kernel density function to estimate values between measurement points to create said behavioral profile.

14. The non-transitory medium of claim 13, wherein said anomaly probability is created by a Lorentz function of said Gaussian kernel density function.

15. The non-transitory medium of claim 10, wherein selecting a kernel bandwidth comprises selecting for data having an unbounded range a bandwidth that incrementally increases with the value of a measurement point, and selecting for data with a bounded range a bandwidth that is constant and based upon the actual data distribution.

16. The non-transitory medium of claim 10 further comprising periodically adapting said behavioral profile using aging to deemphasize older data, said aging comprising reducing values of a previous behavioral profile by a predetermined decay factor before updating the behavioral profile with current data.

17. The non-transitory medium of claim 10 further comprising using measured observable values that have a probability less than said predetermined threshold to update said behavioral profile, and characterizing as outliers for threat analysis values having a probability greater than said predetermined value.

\* \* \* \* \*